United States Patent
Teramoto

(10) Patent No.: US 8,105,395 B2
(45) Date of Patent: Jan. 31, 2012

(54) METHOD FOR MANUFACTURING ELECTRODE PLATE FOR BATTERY

(75) Inventor: Kazutaka Teramoto, Osaka (JP)

(73) Assignee: Panasonic Corporation, Osaka (JP)

( * ) Notice: Subject to any disclaimer, the term of this patent is extended or adjusted under 35 U.S.C. 154(b) by 785 days.

(21) Appl. No.: 11/918,360

(22) PCT Filed: Mar. 31, 2006

(86) PCT No.: PCT/JP2006/306859
§ 371 (c)(1),
(2), (4) Date: Oct. 7, 2008

(87) PCT Pub. No.: WO2006/109594
PCT Pub. Date: Oct. 19, 2006

(65) Prior Publication Data
US 2009/0038144 A1    Feb. 12, 2009

(30) Foreign Application Priority Data

| Apr. 12, 2005 | (JP) | 2005-114882 |
| Oct. 4, 2005 | (JP) | 2005-290622 |
| Jan. 16, 2006 | (JP) | 2006-007426 |

(51) Int. Cl.
  H01M 2/26    (2006.01)
  H01M 4/08    (2006.01)
  H01M 4/64    (2006.01)
  H01M 10/04   (2006.01)
  B23P 13/00   (2006.01)

(52) U.S. Cl. ............... 29/623.1; 29/2; 29/730; 429/128; 429/233

(58) Field of Classification Search ............ 29/623.1, 29/428, 2, 730; 429/163, 72, 233, 128; 219/103, 219/149
See application file for complete search history.

(56) References Cited

U.S. PATENT DOCUMENTS

| 3,441,707 | A | * | 4/1969 | Warner | 219/103 |
| 6,416,559 | B1 | * | 7/2002 | Matsumura et al. | 29/623.1 |
| 2002/0013998 | A1 | | 2/2002 | Jige et al. | |

FOREIGN PATENT DOCUMENTS

JP    8-096803    4/1996

(Continued)

OTHER PUBLICATIONS

Machine Translation of: JP 2002/126828 A, Wadasaki et al., May 8, 2002.*

(Continued)

Primary Examiner — Jonathan Crepeau
Assistant Examiner — Kenneth Douyette
(74) Attorney, Agent, or Firm — McDermott Will & Emery LLP

(57) ABSTRACT

A method for manufacturing an electrode plate for a battery comprises the steps of intermittently transferring a strip-shaped electrode plate material (1) in a longitudinal direction at intervals of a predetermined length and stopping it in a fixed position; and while pressing a cut portion of the electrode plate material (1) from above and below and compression-molding between a top stripper (12) and a top cut die (11) which slide on each other and a bottom stripper (14) and a bottom cut die (13) which slide on each other, cutting the compressed portion with sliding blades (11a and 13a) of the top and bottom cut dies (11 and 13), respectively, on each other. According to this method, the electrode plate material is cut while restraining the generation of a large burr which causes a short circuit between the electrode plates without reducing productivity and increasing costs to obtain the electrode plate for the battery.

10 Claims, 7 Drawing Sheets

FOREIGN PATENT DOCUMENTS

| | | |
|---|---|---|
| JP | 8-318328 | 12/1996 |
| JP | 2001-319644 | 11/2001 |
| JP | 2002-126828 | 5/2002 |

OTHER PUBLICATIONS

Machine Translation of: JP 08/096803 A, Kushida et al., Apr. 12, 1996.*

* cited by examiner

METHOD FOR MANUFACTURING ELECTRODE PLATE FOR BATTERY

RELATED APPLICATIONS

This application is the U.S. National Phase under 35 U.S.C. §371 of International Application No. PCT/JP2006/306859, filed on Mar. 31, 2006, which in turn claims the benefit of Japanese Application No. 2005-114882, filed on Apr. 12, 2005, Japanese Application No. 2005-290622, filed on Oct. 4, 2005, Japanese Application No. 2006-007426, filed on Jan. 16, 2006, the disclosures of which Applications are incorporated by reference herein.

TECHNICAL FIELD

The present invention relates to a method for manufacturing an electrode plate for a battery which is made of a base material having a three-dimensional frame such as a three-dimensional metal porous material and an expanded metal filled or coated with an active material. In particular, the present invention relates to a method for cutting a strip-shaped electrode plate material into a predetermined length while restraining the generation of a burr.

BACKGROUND ART

In recent years, electronic devices such as an audiovisual device, a personal computer, and a portable communication device are quickly made portable or cordless, and a nickel cadmium storage battery, a nickel metal-hydride storage battery, a lithium rechargeable battery and the like are used as a driving power source of the electronic device because these batteries are reliable and easy to maintain. Electrode plates used in such a battery as a positive electrode plate and a negative electrode plate are obtained by cutting a strip-shaped electrode plate material which is made of a base material having a three-dimensional frame such as a three-dimensional metal porous material or expanded metal filled or coated with an active material into a predetermined length.

In a conventional method for cutting an electrode plate material, however, since the electrode plate material is made of a base material having a three-dimensional frame filled or coated with an active material, when the electrode plate material is cut in a state that a flat cut die makes contact with the front face of a portion of the electrode plate material to be cut on both front and rear sides, wastes generated during cutting are crimped on the surface of the electrode plate after cutting by the cut die. Also, cutting leaves a cut burr and a curling burr is generated during returning a blade due to the contact between the electrode plate material and the cut die. If an electrode plate having such a generated burr is installed in a battery, the cut burr on a cutting plane of the electrode plate, for example, a positive electrode plate penetrates through a separator and directly makes contact with a negative electrode plate and hence causes a serious short circuit. In particular, a cut burr extending in parallel with the cutting plane has the high possibility of causing a short circuit. Therefore, when the electrode plate material is cut, it is extremely important to prevent the cut burr from being generated on the cutting plane in order to preclude the major cause of a short circuit of a battery and stabilize the quality of the battery.

Accordingly, to cut an electrode plate material while restraining the generation of the above-mentioned cut burr, a method for cutting an electrode plate material was conventionally proposed by which a pair of cut dies sandwiches and fixes the vicinity of each of both sides of a portion of the electrode plate material to be cut and then the pairs of cut dies are moved oppositely each other in the direction of the thickness of the electrode plate material (refer to, for example, Patent Document 1). Patent Document 1 also proposes a cutting method by which the thickness of the portion of the electrode plate material to be cut and the vicinity of both sides thereof are formed thinner than the other portions. When the electrode plate material is cut, a pair of cut dies sandwiches and fixes each of the both sides of the portion formed thinner and then the pairs of cut dies are moved oppositely each other in the direction of the thickness of the electrode plate material.

As another method for cutting an electrode plate material while restraining the generation of a cut burr, there is known a method passing through a process in which after the electrode plate material is cut with a die for cutting processing, an inside stripper provided inside of a blade and a lifter composing a part of a bottom die sandwich the cut electrode plate on both of front and rear sides while applying proper pressurizing force in a state where both of the blade and an outside stripper composing a top die presses the outside of a cut portion of the electrode plate material against the top face of an anvil, and the electrode plate material is once pressed into the inside of the blade at a predetermined distance and then is brought back toward a tip of the blade (refer to, for example, Patent Document 2).

[Patent Document 1] Japanese Patent Laid-Open Publication No. 2001-319644
[Patent Document 2] Japanese Patent Laid-Open Publication No. 2002-126828

DISCLOSURE OF THE INVENTION

Problems to be Solved by the Invention

In the foregoing method for cutting an electrode plate material, however, there is a clearance between the portion of the electrode plate material to be cut and the top and bottom cut dies, even though it is slight. Thus, shearing force during cutting does not concentrate on the portion to be cut. As a result, the electrode plate material is cut in a state of being torn off so that it is difficult to prevent the generation of a burr. In the method by which the thickness of the portion of the electrode plate material to be cut and the vicinity of both sides thereof are formed thinner in advance, since a clearance is left between the both cut dies and the electrode plate material when the top and bottom cut dies sandwich the thin portion, the thin portion is cut while being torn off so that a large burr is generated. Also, this cutting method separately needs a process of forming the thin portions in the electrode plate material at predetermined intervals, so that the productivity is reduced. In addition to that, since the electrode plate material has to be intermittently sent with high precision during cutting so that the thin portion of the electrode plate material precisely coincides with the top and bottom cut dies, a cutting device becomes expensive.

In the latter method for cutting an electrode plate material, on the other hand, the electrode plate separated from the electrode plate material by cutting is once pressed into the inside of the blade of the die for the cutting processing at a predetermined distance while being sandwiched while applying the proper pressurizing force from both of the front and rear sides to be held in a plane. After that, the electrode plate is brought back to the tip of the blade. Since the electrode plate is ejected from the die after being moved back and force once or more inside the die for cutting processing at the predetermined distance in the direction in parallel with a cutting plane of the electrode plate, most of burrs generated during cutting are torn off or left on the electrode plate material, so that it is possible to obtain the effect of eliminating an extremely large burr from the cutting plane of the electrode plate. This cutting method, on the other hand, needs very complicated structure and operation, so that there are problems that its device and running costs become expensive and the life of the die for processing cannot be ensured.

Considering the foregoing conventional problems, an object of the present invention is to provide a method for manufacturing an electrode plate for a battery by which an electrode plate material is cut while restraining the generation of a large cut burr, which causes a short circuit between electrode plates, without reducing productivity and increasing costs.

Means for Solving the Problems

A method for manufacturing an electrode plate for a battery to achieve the foregoing object comprises the steps of: intermittently transferring a strip-shaped electrode plate material in a longitudinal direction at intervals of a predetermined length and stopping it in a fixed position; and while pressing a cut portion of the electrode plate material from above and below and compression-molding it between a top stripper and a top cut die which slide on each other and a bottom stripper and a bottom cut die which slide on each other, cutting the compressed portion while sliding blades of the top and bottom cut dies on each other.

According to such a method for manufacturing an electrode plate for a battery, since the cut portion is cut while being compressed, the active material does not collapse. Compressing the cut portion to further increase filling density makes it possible to stop the movement of a base material of the electrode plate material during cutting. Since the blades of the top and bottom cut dies slide on each other and the strippers which are opposed to the blades of the cut dies slide on each other, clearance causing a burr does not exist. Cutting the electrode plate material while compressing, instead of compressing the cut portion in advance, does not cause the tear of the electrode plate material during cutting which is caused by the noncontact between the cut die and the compressed portion in contrast to the case of cutting the electrode plate material after compressing it in advance. All room for generating a burr is precluded as described above, so that generation of a burr is minimized in the obtained electrode plate, and in particular, a large burr which causes a short circuit between the electrode plates when being installed in a battery is not generated. Since the cut portion of the electrode plate material is cut while compressing, productivity is not reduced in contrast to a conventional case where compression is carried out in a separate process in advance.

In the foregoing method for manufacturing an electrode plate for a battery, if the cut portions of the electrode plate material are compressed between the top stripper and the bottom cut die opposed to each other and between the top cut die and the bottom stripper opposed to each other, respectively, the cut portion of the electrode plate material is effectively pressed and compressed from above and below.

In the foregoing method for manufacturing an electrode plate for a battery, if compressive pressing protrusions are provided at respective bottom ends of the top cut die and the top stripper and at respective top ends of the bottom cut die and the bottom stripper and these four compressive pressing protrusions locally compress the cut portion of the electrode plate material to intensively press the cut portion from above and below, the cut portion of the electrode plate material locally receives pressing force from each of the compressive pressing protrusions the pressing area of which is set small, and both of the base material and an active material are effectively compressed. In particular, the base material having a three-dimensional frame is concentrated into a central portion in a thickness direction so that the central portion is compressed from a sponge-like form into a metal rich form and is altered into a portion with high filling density. Thus, it is possible to prevent the collapse of the active material during cutting.

Furthermore, in the foregoing method for manufacturing an electrode plate for a battery, if an elastic body biases the top stripper before cutting so that the compressive pressing protrusion of the top stripper is held in a position predetermined distance downwardly away from the compressive pressing protrusion of the top cut die and the electrode plate material starts being cut when the compressive pressing protrusion of the top cut die descends to the position of being flush with the compressive pressing protrusion of the top stripper, cutting by the top and bottom molding dies is started from a point of time when the electrode plate material has been compressed into a predetermined thickness. Thus, it is possible to cut the electrode plate material while restraining effectively the generation of a burr.

In the foregoing method for manufacturing an electrode plate for a battery, the electrode plate material is cut in such a manner that the compressed portion protrudes laterally from the central portion of a cutting plane of the electrode plate material in the thickness direction. Even if a cut burr or a curling burr is generated due to the wear on the blades of the cut dies, such a burr protrudes from the compressed portion in the central portion in the thickness direction and hence does not protrude from the surface of the electrode plate. Thus, the burr does not cause the occurrence of a short circuit between the electrodes when the electrode plate is installed in the battery and hence no problem comes up. In other words, the cut dies are available until wear on each blade progresses to a certain extent and an enough life is ensured, so that it is possible to achieve high productivity.

Another method for manufacturing an electrode plate for a battery according to the present invention comprises the step of: intermittently transferring a strip-shaped electrode plate material in a longitudinal direction at intervals of a predetermined length and stopping it in a fixed position; and while pressing a cut portion of the electrode plate material from above and below and compression-molding between a top stripper and a top cut die which slide on each other and a bottom stripper and a bottom cut die which slide on each other, cutting the compressed portion while sliding blades of the top and bottom cut dies on each other. Pressurizing force for compression is applied on the top stripper and the bottom stripper which compress the electrode plate material with the opposed bottom cut die and the top cut die, respectively, while the pressurizing force is automatically adjusted so as to fall within a predetermined range set in advance.

According to such a method for manufacturing an electrode plate for a battery, since the cut portion of an electrode plate material is cut while being compressed into a predetermined thickness, cutting the electrode plate material with the cut portion being denatured so as to further increase the filling density thereof makes it possible to stop the movement of a base material of the electrode plate material during cutting. In addition to this, since the blades of the top and bottom cut dies slide on each other and the strippers which are opposed to the blades of the cut dies slide on each other, any clearance causing a burr does not exist. All room for generating a burr is precluded, so that it is possible to cut the electrode plate material with hardly causing a burr. In addition to these, the pressurizing force applied on each of the top and bottom strippers for compressing the cut portion of the electrode plate material is automatically adjusted so as to fall within a predetermined range of the pressurizing force in accordance with various kinds of electrode plate materials. Since any electrode plate material is cut in the state of being compressed to have an appropriate filling density, it is possible to restrain the generation of a burr due to lack of compression and the occurrence of the collapse of an active material due to excess of compression. Since the range of the pressurizing force applied on the top and bottom strippers is just set before starting cutting processes, productivity is not reduced in contrast to the case of, for example, exchanging compression coil springs whenever the kind of electrode plate material to be cut differs.

In the foregoing method for manufacturing an electrode plate for a battery, the pressurizing force may be applied on the top stripper and the bottom stripper with the use of pressurizing cylinders by which the pressurizing forces are automatically adjusted so as to fall within the range set in advance in response to a reaction force from the electrode plate material under compression. The pressurizing cylinder for applying the pressurizing force on each of the top and bottom strippers maintains the pressurizing force applied on the stripper within the pressurizing force range set in advance by backwardly displacing a piston rod in response to variation in the filling density of the active material of the electrode plate material with the progress of compression, and hence has the function of automatically adjusting the pressurizing force applied on the stripper. Applying the pressurizing force on the top and bottom strippers by such pressurizing cylinders makes it possible to automatically adjust the pressurizing force applied on the strippers so as to fall within the predetermined range with reliability while reducing its costs as compared with the case of using a servo motor or the like and also have general versatility with ease of setting the pressurizing force range.

BEST MODE FOR CARRYING OUT THE INVENTION

Figure 1:
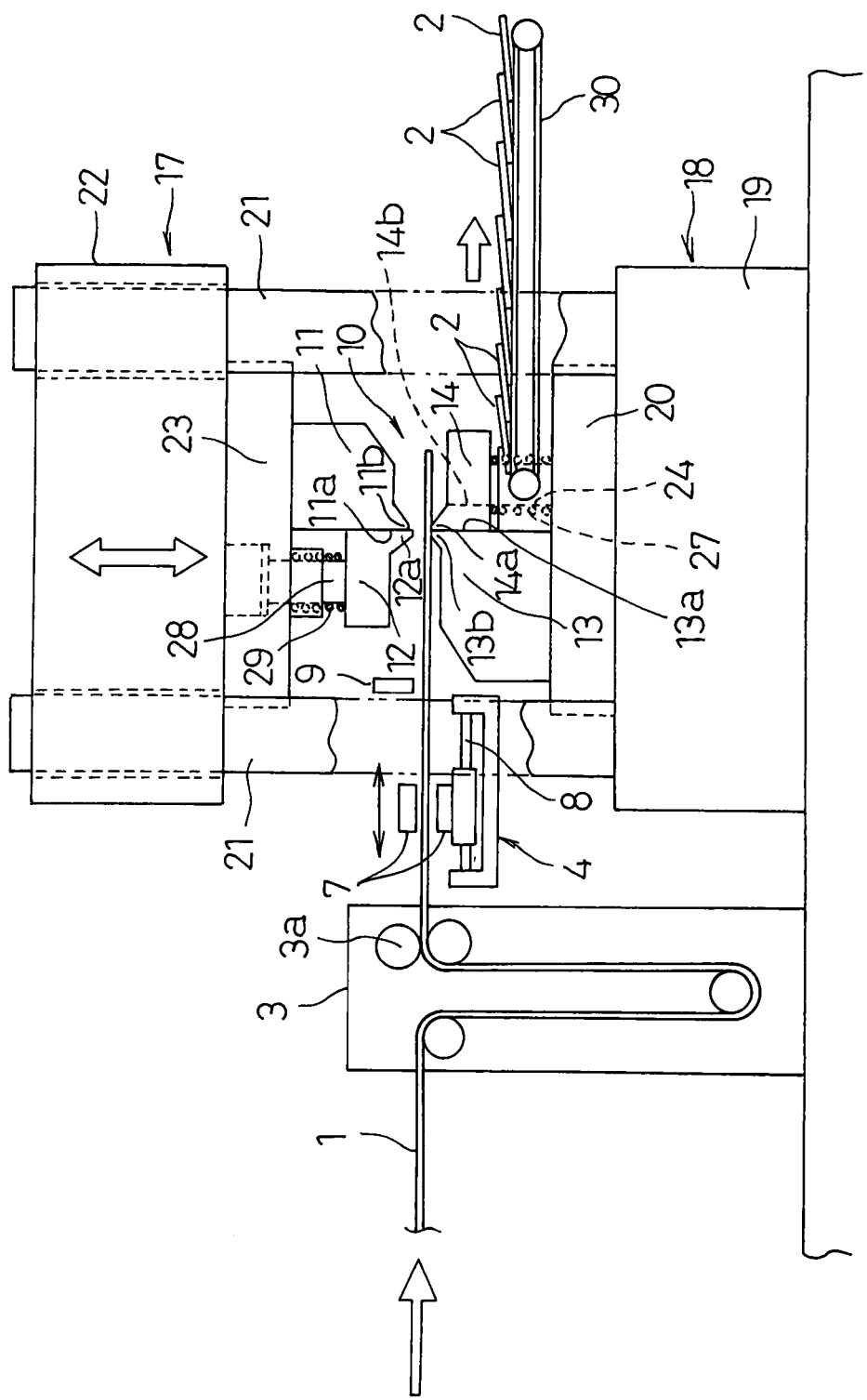
FIG. 1 is a schematic front view of an electrode plate manufacturing device which embodies a method for manufacturing an electrode plate for a battery according to a first embodiment of the present invention.

A first embodiment of the present invention will be hereinafter described in detail with reference to FIGS. 1 to 3 and FIGS. 8 to 9B. FIG. 1 is a schematic front view of an electrode plate manufacturing device which embodies a method for manufacturing an electrode plate for a battery according to the first embodiment of the present invention. The electrode plate manufacturing device intermittently transfers a strip-shaped electrode plate material 1 at intervals of predetermined length and sequentially cuts the electrode plate material 1 into the predetermined length to obtain an electrode plate 2. The electrode plate material 1 is, for example, a base material made of a three-dimensional nickel metal porous material in sponge-like form filled with an active material in a paste form or a base material made of a expanded metal coated with an active material in a paste form.

The foregoing strip-shaped electrode plate material 1 which is wound around a send-out reel (not illustrated) or the like is supplied to an accumulator 3 by the rotation of a send-out roller. After that, in a fixed-length transferring mechanism 4, chucking members 7 move with a predetermined length along a guide rail 8 while sandwiching the electrode plate material 1, so that the electrode plate material 1 of a predetermined length is intermittently sent out to a cut die mechanism 10. A sent length confirmation sensor 9 detects that the predetermined length of the electrode plate material 1 has been sent out and outputs a detection signal. Since the foregoing fixed-length transferring mechanism 4 stops the movement of the chucking members 7 upon receipt of the detection signal from the sent length confirmation sensor 9, the predetermined length of the electrode plate material 1 is intermittently sent out with precision. At this time, a one-way rotatable stopper roller 3a in the accumulator 3 prevents the return of the electrode plate material 1 the predetermined length of which has been sent out.

The foregoing cut die mechanism 10 comprises a top cut die 11, a top stripper 12, a bottom cut die 13, and a bottom stripper 14. The top cut die 11 is disposed oppositely to the bottom stripper 14 and the top stripper 12 is disposed oppositely to the bottom cut die 13 in a vertical direction. A blade 11a of the top cut die 11 is relatively disposed so as to make contact with an opposed side face of the top stripper 12 without clearance and slide on each other. A blade 13a of the bottom cut die 13 is relatively disposed so as to make contact with an opposed side face of the bottom stripper 14 without clearance and slide on each other. In the top cut die 11, the top stripper 12, the bottom cut die 13, and the bottom stripper 14, compressive pressing protrusions 11b, 12a, 13b, and 14a protruding toward a cut portion of the electrode plate material 1 are formed, respectively. The horizontally adjacent compressive pressing protrusions 11b and 12a of the top cut die 11 and the top stripper 12, respectively, make the shape of a trapezoid in cross section in combination. The horizontally adjacent compressive pressing protrusions 13b and 14a of the bottom cut die 13 and the bottom stripper 14, respectively, make the shape of a trapezoid in cross section in combination.

The top cut die 11 and the top stripper 12 are attached to a top die 17. The bottom cut die 13 and the bottom stripper 14 are attached to a bottom die 18. The bottom die 18 is composed of a die plate 20 fixed on a press head 19. The bottom cut die 13 and the bottom stripper 14 are provided on the die plate 20. In other words, the bottom cut die 13 is fixedly disposed on the die plate 20. The bottom stripper 14 is attached to the die plate 20 movably in the vertical direction through a bottom guide shaft 24, and is upwardly biased by a compression coil spring 27 so as to be held in an illustrated upper limit position under normal conditions. The compressive pressing protrusion 14a of the bottom stripper 14 in the upper limit position, which is positioned flush with the compressive pressing protrusion 13b of the bottom cut die 13, functions as a support base of the electrode plate material 1 that is intermittently transferred.

On the other hand, the top die 17 is composed of a punch plate 23 which is fixed on a bottom face of a press frame 22 moving up and down along a plurality of guide posts 21 erected on the press head 19. The top cut die 11 and the top stripper 12 are provided on the punch plate 23. In other words, the top cut die 11 is fixed on the bottom face of the press frame 22. The top stripper 12 is attached to the press frame 22 movably in the vertical direction through a top guide shaft 28, and is downwardly biased by a compression coil spring 29 so as to be held in an illustrated lower limit position under normal conditions. The compressive pressing protrusion 12a of the top stripper 12 in the lower limit position is held in a position downwardly predetermined distance away from the compressive pressing protrusion 11b of the top cut die 11. The details thereof will be described later on. The top cut die 11 and the bottom cut die 13 cut the electrode plate material 1 to obtain an electrode plate 2 and a carrier conveyor 30 carries the electrode plate 2 to a predetermined position. The bottom stripper 14 is provided with a hollow section 14b so that the bottom stripper 14 moves up and down without interfering with the carrier conveyor 30.

Figure 2A:
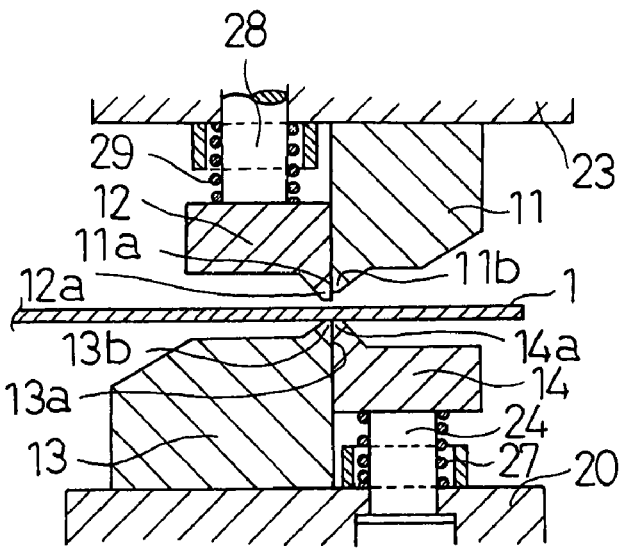
FIGS. 2A to 2C are enlarged sectional views which show the cutting operation of an electrode plate material by the above electrode plate manufacturing device in order of processes.
Figure 2B:
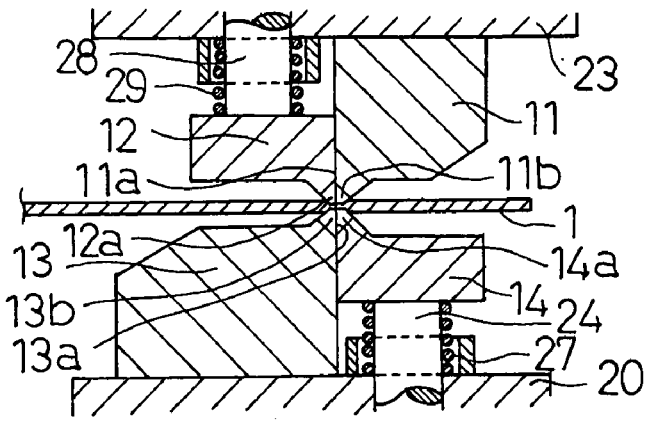
Figure 2C:
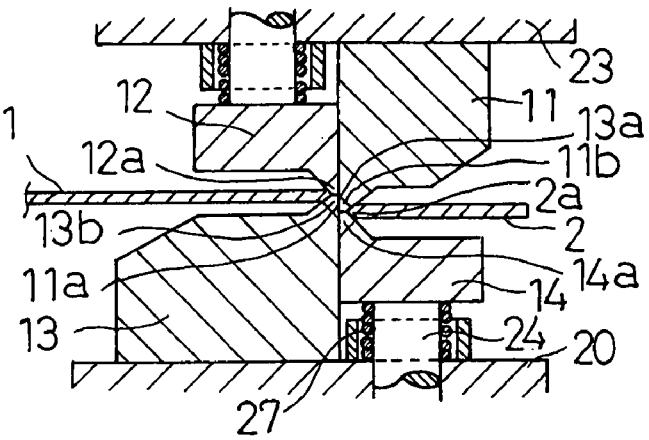

Next, the operation of obtaining the electrode plate 2 by cutting the electrode plate material 1 into the predetermined length by the foregoing electrode plate manufacturing device will be described with reference to FIGS. 2A to 2C. FIGS. 2A to 2C are enlarged sectional views showing the cutting operation of the electrode plate material 1 in order of processes. As shown in FIG. 2A, in a state before cutting, the top stripper 12 is held in the lower limit position by the bias of the compression coil spring 29 and the bottom stripper 14 is held in the upper limit position by the bias of the compression coil spring 27 so that the top stripper 12 and the bottom stripper 14 are disposed next to the top cut die 11 and the bottom cut die 13, respectively. At this time, the compressive pressing protrusions 13b and 14a of the bottom cut die 13 and the bottom stripper 14, respectively, form the shape of a trapezoid in cross section in combination, and the transferred electrode plate material 1 is mounted on the compressive pressing protrusions 13b and 14a of the bottom cut die 13 and the bottom stripper 14. However, the compressive pressing protrusion 12a of the top stripper 12, as described above, is held in a position slightly downwardly away from the compressive pressing protrusion of the top cut die 11.

Figure 3:
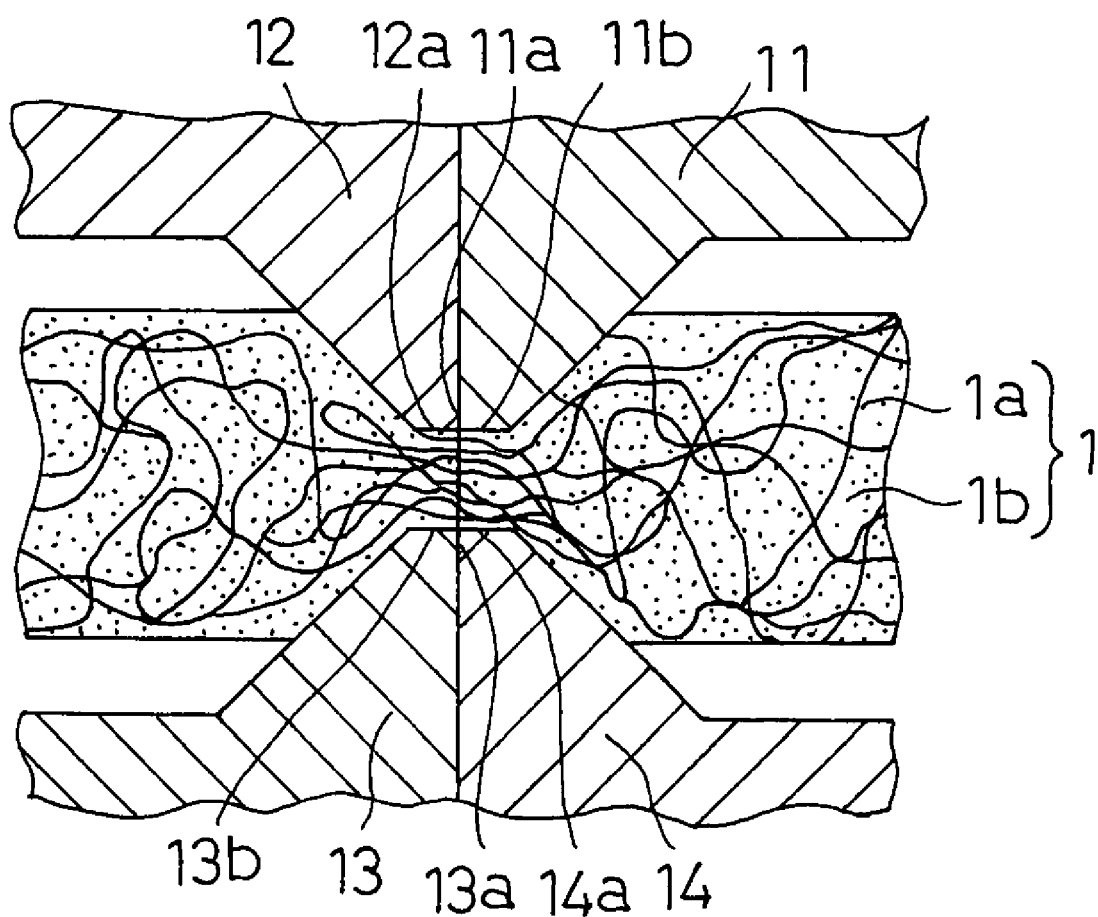
FIG. 3 is a partly enlarged view of FIG. 2B.

In the state described above, if the predetermined length of the electrode plate material 1 is transferred and stopped in a fixed position, the press frame 22 of the top die 17 as shown in FIG. 1 starts descending operation along the guide posts 21. Thus, as shown in FIG. 2B, the electrode plate material 1 is crushed between the compressive pressing protrusion 12a of the top stripper 12 which descends with the press frame 22 and the compressive pressing protrusion 13b of the bottom cut die 13. At this time, the top guide shaft 28 for supporting the top stripper 12 is inserted into the punch plate 23 with the compression coil spring 29 being compressed. After the vertical movement of the top stripper 12 is stopped by the function of stopping the insertion of the top guide shaft 28 at a predetermined distance, the compressive pressing protrusion 11b of the top cut die 11 which keeps descending becomes flush with the compressive pressing protrusion 12a of the top stripper 12. FIG. 3 is an enlarged view showing a state at this time.

As shown in FIG. 3, the compressive pressing protrusions 11b and 12a of the top cut die 11 and the top stripper 12, respectively, which are positioned flush with each other, and the compressive pressing protrusions 13b and 14a of the bottom cut die 13 and the bottom stripper 14, respectively, which are positioned flush with each other, press a portion of the electrode plate material 1 to be cut from above and below so as to compress a central portion thereof in a thickness direction into a predetermined thickness. At this time, the cut portion of the electrode plate material 1 receives locally a concentrated pressing force from each of the compressive pressing protrusions 11b, 12a, 13b, and 14a the pressing area of which is set small and both of a base material 1a and an active material 1b are effectively compressed. In particular, the base material 1a having a three-dimensional frame concentrated into the central portion is compressed from a sponge-like form into a metal rich form and is altered into a portion with a high filling density.

The top die 17 further keeps descending from the state as shown in FIG. 2B. The blade 11a of the top cut die 11, as shown in FIG. 2C, protrudes downward relatively to the top stripper 12 which stops descending while sliding on the opposed side face thereof and then cuts the compressed portion of the electrode plate material 1 while sliding on the blade 13a of the bottom cut die 13. At this time, the bottom stripper 14 which receives pressing force from the blade 11a of the descending top cut die 11 through the electrode plate material 1 supports the electrode plate material 1 so that the blade 11a certainly cuts the electrode plate material 1 while the bottom stripper 14 is integrally pressed down in a state of sandwiching the electrode plate material 1 with the blade 11a. When the electrode plate material 1 has been cut and the blade 11a has stopped descending, the bottom stripper 14 stops. The electrode plate 2 is separated and obtained by cutting the electrode plate material 1.

Figure 8:
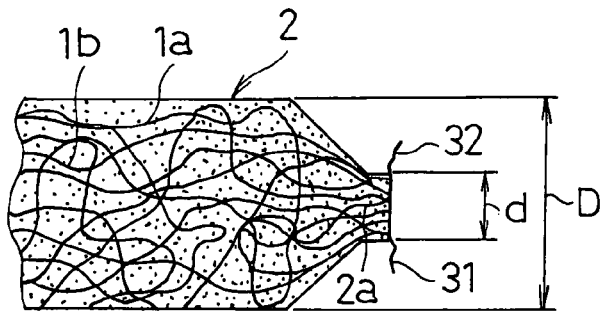
FIG. 8 is a sectional view of the electrode plate after being manufactured.

After that, the top die 17 ascends and each of the strippers 12 and 14 returns to an original position by the bias of each of the compression coil springs 27 and 29. FIG. 8 shows the electrode plate 2 which is obtained by cutting the electrode plate material 1 into the predetermined length. The thickness d of the compressed portion 2a being the cut portion is set within a range of 1/10 to 1/2 of an original thickness D. The thickness d is adjusted by selectively using a spring with a proper spring constant as the compression coil spring 29 of the top stripper 12.

In the electrode plate 2 obtained through such cutting processes, since the blades 11a and 13a of the top and bottom cut dies 11 and 13, respectively, cut the electrode plate material while compressing the cut portion of the electrode plate material into the predetermined thickness d, the active material 1b does not collapse in contrast to the case of conventionally cutting the electrode plate material 1 with both faces of the cut portion being sandwiched. In the foregoing cutting processes, in addition to that the active material 1b does not collapse during cutting as described above, cutting is carried out with the cut portion being compressed and further with the filling density being increased to stop the movement of the base material 1a. Since the blades 11a and 13a of both of the cut dies 11 and 13 slide on each other and the strippers 12 and 14 which are opposed to the blades 11a and 13a of the cut dies 11 and 13 slide on each other, clearance generating a burr does not exist. Cutting the electrode plate material 1 with the material being compressed, instead of compressing the cut portion in advance, does not cause the tear of the electrode plate material 1 during cutting which is caused by the non-contact between the cut die and the compressed portion in contrast to the case of cutting the electrode plate material 1 after compressing it in advance. All room for generating a burr is precluded as described above, so that a burr is hardly generated in the obtained electrode plate 2, and in particular, a large burr which causes a short circuit between the electrode plates when being installed in a battery is not generated.

Since the cut portion of the electrode plate material 1 is cut while being compressed, productivity is not reduced in contrast to a conventional case where compression is carried out in advance in another process. Furthermore, when the blades 11a and 13a of the cut dies 11 and 13 are worn, a cut burr 31 and a curling burr 32 are generated as shown in FIG. 8. Such burrs 31 and 32 protrude from the compressed portion 2a in the central portion in the thickness direction. Since the thickness d of the compressed portion 2a is set within a range of ⅒ to ½ of the original thickness D, the burrs 31 and 32 do not protrude from the surface of the electrode plate 2. The burrs 31 and 32 do not cause the occurrence of a short circuit between the electrodes when being installed in a battery and hence no problem comes up. In other words, the cut dies 11 and 13 are available until wear on each of the blades 11a and 13a progresses to a certain extent, so that it is possible to say that an enough life is ensured.

Figure 9A:
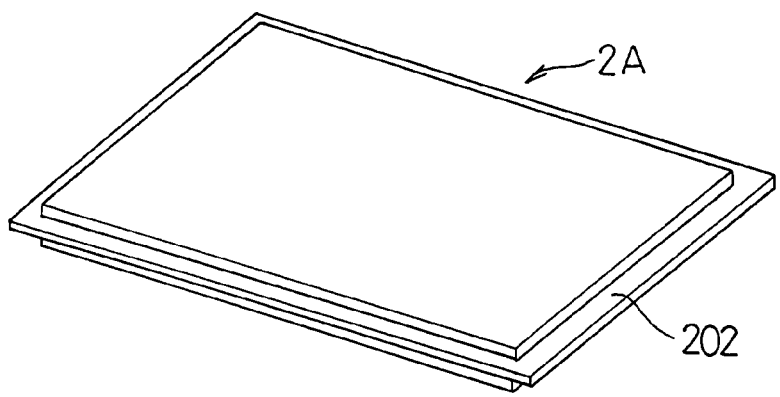
FIGS. 9A and 9B are perspective views of different kinds of electrode plates after being manufactured.
Figure 9B:
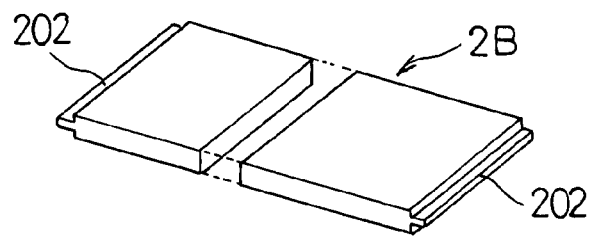

FIGS. 9A and 9B show electrode plates 2A and 2B which are obtained through the foregoing cutting processes. In the electrode plate 2A of FIG. 9A which is trimmed by the top and bottom cut dies 11 and 13, a thin compressed portion 202 is formed in the central portion of the whole periphery of side faces in the thickness direction. In the electrode plate 2B of FIG. 9B into which a hoop-shaped electrode plate material 1 is cut, a thin compressed portion 202 is formed in the central portion of ahead and behind side faces in a transferring direction in the thickness direction.

Next, a second embodiment of the present invention will be hereinafter described in detail with reference to FIGS. 4 to 9B. The same reference numbers refer to components common to the foregoing first embodiment and the description thereof will be omitted. Only differences will be mainly described.

Figure 4:
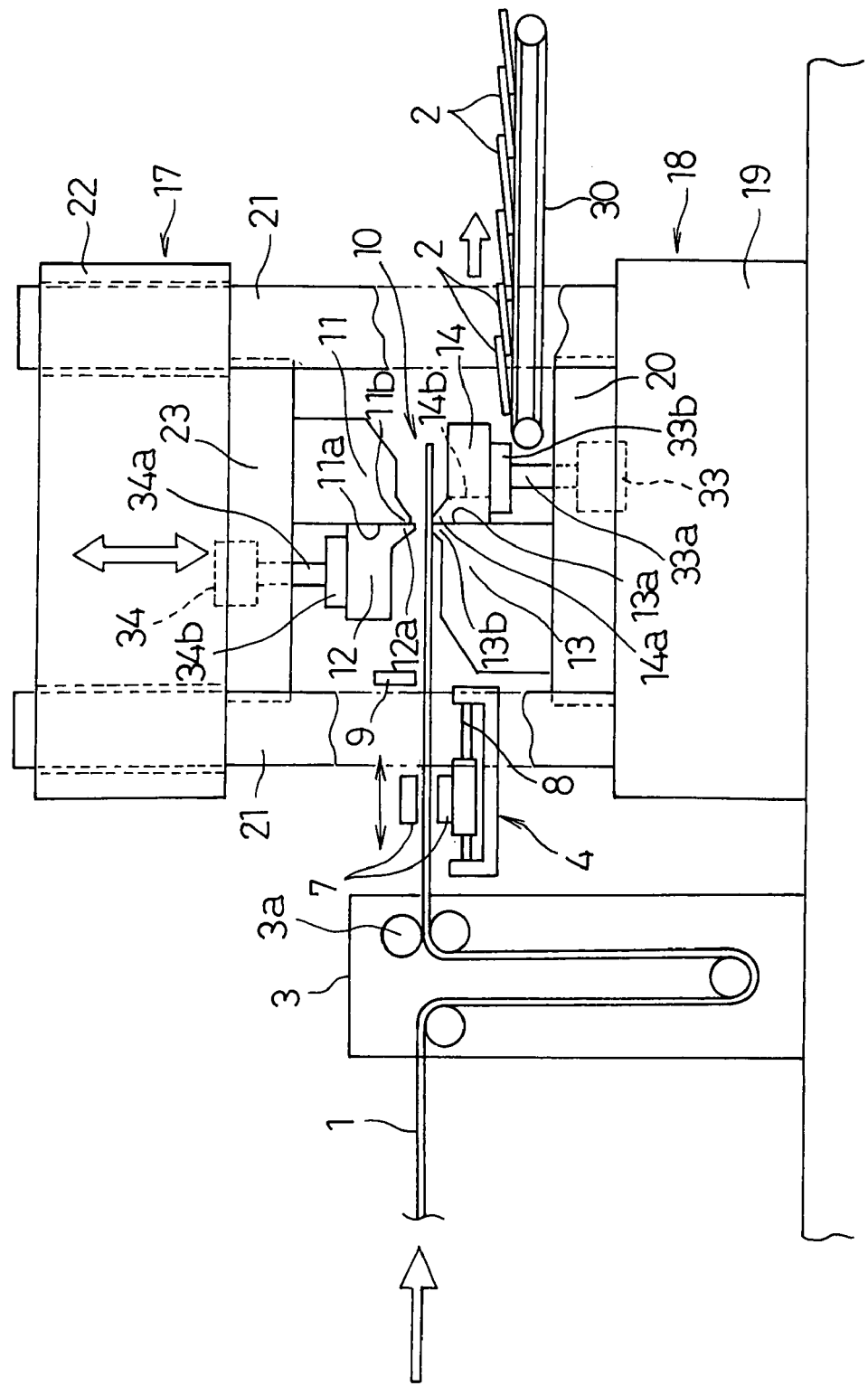
FIG. 4 is a schematic front view of an electrode plate manufacturing device which embodies a method for manufacturing an electrode plate for a battery according to a second embodiment of the present invention.

In an electrode plate manufacturing device shown in FIG. 4 which embodies a method for manufacturing an electrode plate for a battery according to a second embodiment of the present invention, a bottom pressurizing cylinder 33 comprising an air cylinder or a hydraulic cylinder is provided on a press head 19 in vertical location instead of the compression coil spring 27 in the first embodiment. The foregoing bottom stripper 14 is fixed to an attachment plate 33b which is fixed to an end of a piston rod 33a of the bottom pressurizing cylinder 33 and is supported in a state of being biased upwardly.

In the foregoing bottom pressurizing cylinder 33, the desired range of pressurizing force can be set by manual operation. When the bottom pressurizing cylinder 33 receives a reaction force from the bottom stripper 14 during compressing an electrode plate material 1, the piston rod 33a moves backward so that the pressurizing force to the bottom stripper 14 always falls within the set range. The piston rod 33a of the bottom pressurizing cylinder 33 is held in a discharge position and the bottom stripper 14 is held in an illustrated upper limit position under normal conditions. A compressive pressing protrusion 14a of the bottom stripper 14 in the upper limit position is positioned flush with a compressive pressing protrusion 13b of a bottom cut die 13 to function as a support base of the electrode plate material 1 intermittently transferred.

On the other hand, a top die 17 is composed of a punch plate 23 which is fixed on a bottom face of a press frame 22 moving up and down along a plurality of guide posts 21 erected on a press head 19. The foregoing top cut die 11 is fixed on the bottom face of the punch plate 23. In the press frame 22, a top pressurizing cylinder 34 comprising an air cylinder or a hydraulic cylinder is provided in a vertical location. The foregoing top stripper 12 is fixed to an attachment plate 34b which is fixed to an end of a piston rod 34a of the top pressurizing cylinder 34 and is supported in the state of being biased downwardly.

As in the case of the bottom pressurizing cylinder 33, the range of pressurizing force of the foregoing top pressurizing cylinder 34 can be set by manual operation. When the top pressurizing cylinder 34 receives a reaction force from the top stripper 12 during compressing the electrode plate material 1, the piston rod 34a moves backward so that the pressurizing force to the top stripper 12 always falls within the set range. The piston rod 34a of the top pressurizing cylinder 34 is held in a discharge position and the top stripper 12 is held in an illustrated lower limit position under normal conditions. A compressive pressing protrusion 12a of the top stripper 12 in the lower limit position is held in a position downwardly predetermined distance away from a compressive pressing protrusion 11b of a top cut die 11. The details thereof will be described later on.

The top cut die 11 and the bottom cut die 13 cut the electrode plate material 1 to obtain an electrode plate 2 and a carrier conveyor 30 carries the electrode plate 2 to a predetermined position. The bottom stripper 14 is provided with a hollow section 14b so that the bottom stripper 14 moves up and down without interfering with the carrier conveyor 30.

As described above, since the bottom pressurizing cylinder 33 and the top pressurizing cylinder 34 comprising an air cylinder or a hydraulic cylinder are provided instead of the compression coil springs 29 and 27 for biasing the top and bottom strippers 12 and 14 described in the first embodiment, it becomes unnecessary to replace the compression coil springs 29 and 27 whenever the kind of the base material or the active material of the electrode plate material 1 to be cut or the filling density of the active material differs.

Figure 5A:
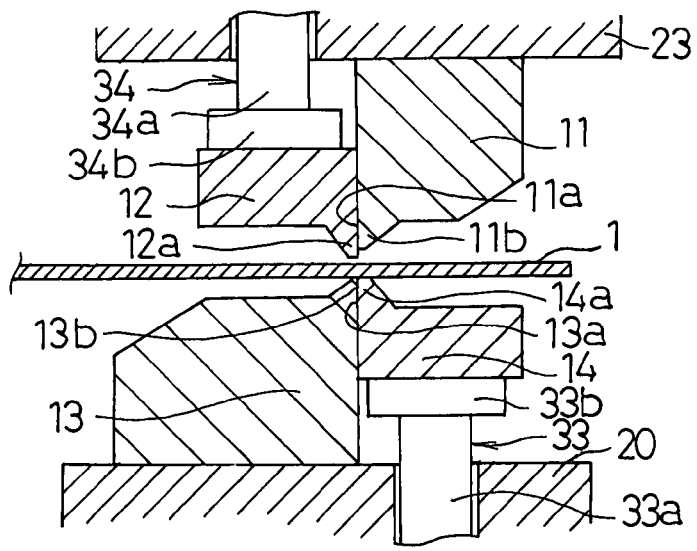
FIGS. 5A to 5C are enlarged sectional views which show the cutting operation of an electrode plate material by the above electrode plate manufacturing device in order of processes.
Figure 5B:
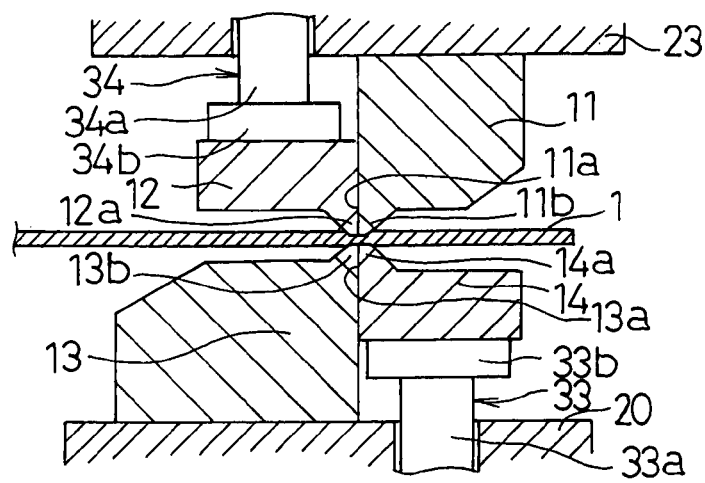
Figure 5C:
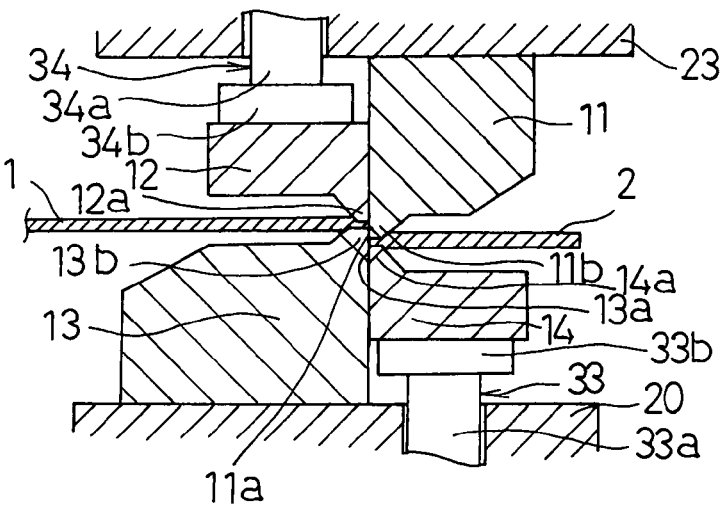

Next, the operation of obtaining the electrode plate 2 by cutting the electrode plate material 1 into a predetermined length using the electrode plate manufacturing device will be described with reference to FIGS. 5A to 5C. FIGS. 5A to 5C are enlarged sectional views showing the cutting operation of the electrode plate material 1 in order of processes. As shown in FIG. 5A, in a state before cutting, the top stripper 12 is held in the lower limit position by the top pressurizing cylinder 34 and the bottom stripper 14 is held in the upper limit position by the bottom pressurizing cylinder 33 so that the top stripper 12 and the bottom stripper 14 are disposed next to the top cut die 11 and the bottom cut die 13, respectively. At this time, the compressive pressing protrusions 13b and 14a of the bottom cut die 13 and the bottom stripper 14, respectively, form the shape of a trapezoid in cross section in combination. The top faces of the compressive pressing protrusions 13b and 14a of the bottom cut die 13 and the bottom stripper 14, respectively, are held flush with each other and the transferred electrode plate material 1 is mounted thereon. However, the compressive pressing protrusion 12a of the top stripper 12, as described above, is held in a position slightly downwardly away from the compressive pressing protrusion of the top cut die 11.

In the state described above, if the predetermined length of the electrode plate material 1 is transferred and stopped in a fixed position, the press frame 22 of the top die 17 as shown in FIG. 4 starts descending operation along the guide posts 21. Thus, as shown in FIG. 5B, the electrode plate material 1 is crushed and compressed from above and below between the compressive pressing protrusion 12a of the top stripper 12 which descends with the press frame 22 and the compressive pressing protrusion 13b of the bottom cut die 13. At this time, a reaction force acting from the crushed electrode plate material 1 on the compressive pressing protrusion 12a gradually increases with the crush of the electrode plate material 1, and the reaction force is applied on the top pressurizing cylinder 34 as is. In accordance with the descent of the press frame 22, on the other hand, the electrode plate material 1 is crushed too between the compressive pressing protrusion 11b of the top cut die 11 and the compressive pressing protrusion 14a of the bottom stripper 14. At this time, the reaction force acting from the crushed electrode plate material 1 on the compressive pressing protrusion 14a of the bottom stripper 14 gradually increases with the crush of the electrode plate material 1, and the reaction force is applied on the bottom pressurizing cylinder 33 as is.

Figure 6:
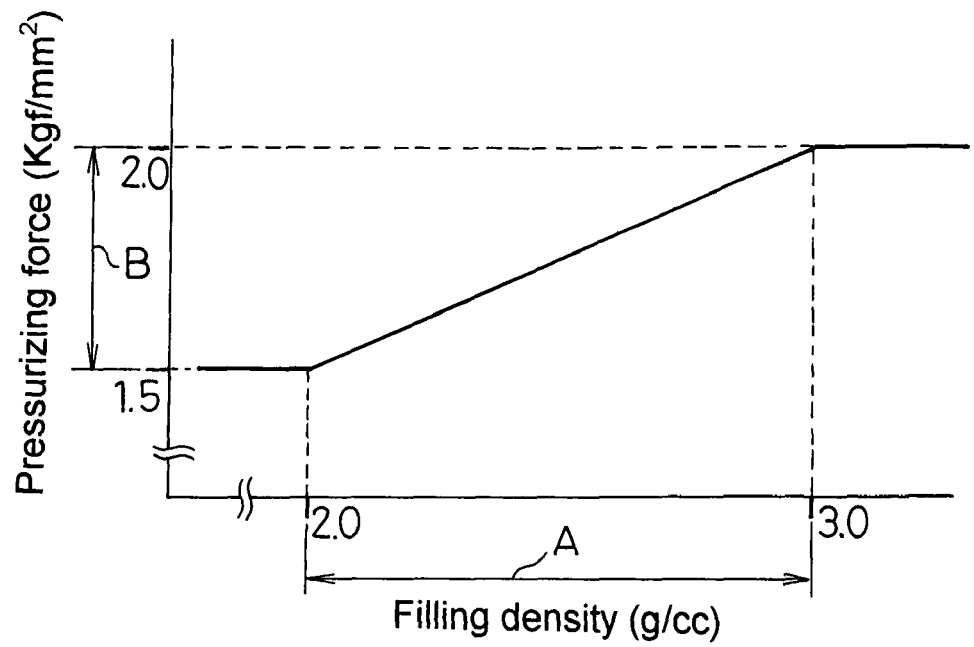
FIG. 6 is a graph showing the relationship between the filling density of an active material and pressurizing force in compressing the electrode plate material.

The foregoing top and bottom pressurizing cylinders 34 and 33 function so as to maintain the range of pressurizing force manually set in advance. FIG. 6 shows experimental results of the relationship between the filling density of the active material and the pressurizing force when the active material of the electrode plate material 1 is compressed. It has been found out that when the filling density is 2.0 g/cc or less, a cut burr or a curling burr is easily generated due to lack of the compression of the active material. When the filling density is 3.0 g/cc or more, the active material is easy to collapse due to excess of the compression of the active material. Therefore, compressing the electrode plate material 1 within a pressurizing force range B with which the active material is compressed into a filling density range A of 2.0 g/cc to 3.0 g/cc makes it possible to form a compressed portion while restraining the generation of a burr and the collapse of the active material. However, FIG. 6 is just an example of the experimental results, and experimental results slightly vary in accordance with difference in the kind of base material or active material and difference in the filling density of the active material before compression.

Accordingly, a preferable pressurizing force range B has been calculated by experiment on a per electrode plate material 1 to be cut, and the pressurizing force range B of the electrode plate material 1 to be cut is manually set on the top and bottom pressurizing cylinders 34 and 33 before the cutting processes. The top and bottom pressurizing cylinders 34 and 33 function so as to maintain the pressurizing force on the electrode plate material 1 within the pressurizing force range B by backwardly displacing the piston rods 34a and 33a in response to increase in the reaction force from the compressed electrode plate material 1 through the strippers 12 and 14.

Figure 7:
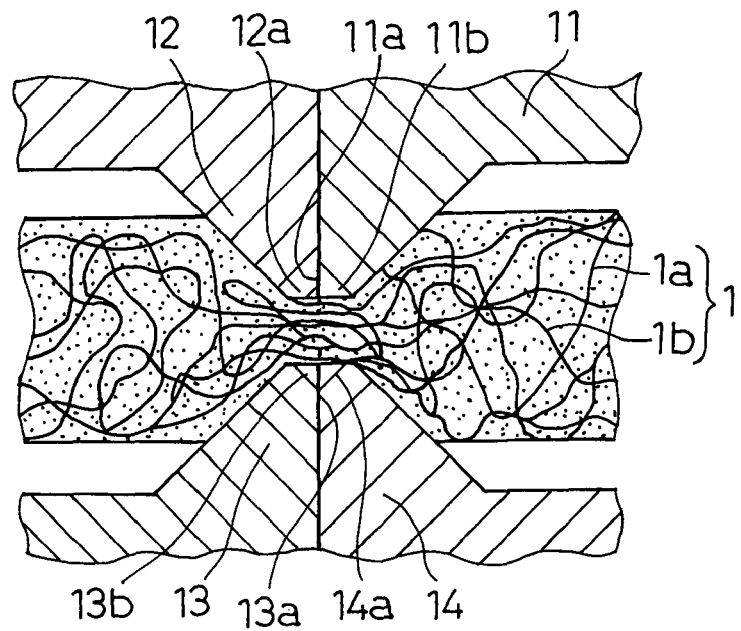
FIG. 7 is a partly enlarged view of FIG. 5B.

Therefore, when the descending top stripper 12 compresses the electrode plate material 1 to such a state that the active material thereof has a predetermined filling density, the piston rod 34a of the top pressurizing cylinder 34 is backwardly displaced in accordance with the descent of the top die 17 from that point on and the top stripper 12 stops descending though the top die 17 keeps descending. Thus, the compressive pressing protrusion 11b of the top cut die 11 keeping descending descends to the position of being flush with the compressive pressing protrusion 12a of the top stripper 12 in a short time. The bottom stripper 14, on the other hand, is held in the upper limit position by the bottom pressurizing cylinder 33 to keep supporting the electrode plate material 1 until at least the compressive pressing protrusion 11b of the top cut die 11 descends to the position of being flush with the compressive pressing protrusion 12a of the top stripper 12. Accordingly, the electrode plate material 1 is compressed between the compressive pressing protrusion 14a of the bottom stripper 14 and the compressive pressing protrusion 11b of the top cut die 11, too. FIG. 7 is an enlarged view showing the state at this point.

As shown in FIG. 7, a portion of the electrode plate material 1 to be cut is pressed by the compressive pressing protrusions 11b and 12a of the top cut die 11 and the top stripper 12, respectively, which are positioned flush with each other and the compressive pressing protrusions 13b and 14a of the bottom cut die 13 and the bottom stripper 14, respectively, from above and below with the predetermined pressurizing force and is compressed into a predetermined thickness in the central portion in the thickness direction. At this time, the cut portion of the electrode plate material 1 receives locally a concentrated pressing force from each of the compressive pressing protrusions 11b, 12a, 13b, and 14a the pressing area of which is set small and both of a base material 1a and an active material 1b are effectively compressed. In particular, the base material 1a having a three-dimensional frame concentrated into the central portion is compressed from a sponge-like form into a metal rich form and is altered into a portion with a high filling density.

Since the top die 17 further keeps descending from the state as shown in FIG. 5B, the blade 11a of the top cut die 11, as shown in FIG. 5C, moves downward relatively to the top stripper 12 which becomes unable to descend while sliding on the opposed side face thereof and cuts the compressed portion of the electrode plate material 1 while sliding on a blade 13a of the bottom cut die 13. At this time, the bottom pressurizing cylinder 33 supports the bottom stripper 14 which is pressed down through the cut electrode plate material 1 with the descent of the top cut die 11 while backwardly displacing the piston rod 33a in the state of maintaining the pressurizing force to the top stripper 14 within the predetermined pressurizing force range B, so that the piston rod 33a moves backward integrally with the bottom stripper 14. Accordingly, the compressed portion of the electrode plate material 1 is cut while maintaining a compressed state in which the active material has the predetermined filling density, and an electrode plate 2 is obtained by that cutting. After that, the top die 17 ascends and each of the strippers 12 and 14 returns to the original position by the discharge operation of the corresponding pressurizing cylinders 34 and 33.

FIG. 8 shows the electrode plate 2 which is obtained by cutting the electrode plate material 1 into the predetermined length. The thickness d of a compressed portion 2a being a cut portion is set within a range of 1/10 to 1/2 of an original thickness D. The thickness d is obtained by setting the predetermined pressurizing force range B on the top and bottom cylinders 34 and 33.

In the foregoing cutting processes, since the blades 11a and 13a of the top and bottom cut dies 11 and 13, respectively, cut the electrode plate material 1 while compressing the cut portion of the electrode plate material 1 into the predetermined thickness d, cutting the cut portion the filling density of which is increased by compression can stop the movement of the base material 1a of the electrode plate material 1 during cutting. Also, since the blades 11a and 13a of the both cut dies 11 and 13 slide on each other and the strippers 12 and 14 which are opposed to the blades 11a and 13a of the cut dies 11 and 13 slide on each other, there is no clearance causing the generation of a burr. Furthermore, cutting the electrode plate material 1 with compressing it, instead of compressing the cut portion in advance, does not cause the curling of the electrode plate material 1 in cutting which is caused by the noncontact between the cut die and the compressed portion in contrast to the case of cutting the electrode plate material 1 after compressing it in advance. All room for generating a burr is precluded as described above, so that a burr is hardly generated in the obtained electrode plate 2, and in particular, a large burr which causes a short circuit between the electrode plates when being installed in a battery is not generated.

Furthermore, the foregoing cutting processes can produce the conspicuous effect of cutting various kinds of electrode plate materials 1 in which the kind of base material 1a or active material 1b or the filling density of the active material 1b differs from each other without reducing productivity while restraining the occurrence of the collapse of the active material 1b. In other words, the top and bottom pressurizing cylinders 34 and 33 which support the top and bottom strippers 12 and 14 for compressing the cut portion of the electrode plate material 1 with pressurizing them function so that the pressurizing force applied on the top and bottom strippers 12 and 14 remains within the predetermined pressurizing force range B set in advance by backwardly displacing the piston rods 34a and 33a in response to variation in the filling density of the active material 1b of the electrode plate material 1 in accordance with the progress of compression.

Accordingly, since the pressurizing force on the top and bottom stripper 12 and 14 is automatically adjusted so as to fall within the predetermined pressurizing force range B in accordance with various kinds of electrode plate materials 1 in which the kind of base material 1a or active material 1b or the filling density of the active material 1b differs from each other, it is possible to cut any kind of electrode plate materials 1 in the state of compressing it into appropriate filling density. In particular, it is possible to restrain the occurrence of the collapse of the active material due to excess of the compression of the active material. Furthermore, the pressurizing force range B on the top and bottom strippers 12 and 14 is just set on the top and bottom pressurizing cylinders 34 and 33 by manual operation before starting the cutting processes, so that productivity is not reduced. Since the pressurizing force on the top and bottom strippers 12 and 14 is applied while being automatically adjusted by the cylinders 34 and 33, it is possible to reduce costs as compared with the case of using an expensive servo motor or the like and also have general versatility with ease of setting a pressurizing force range.

The second embodiment takes the case of setting the pressurizing force range B applied on the top and bottom strippers 12 and 14 on the top and bottom cylinders 34 and 33 by the manual operation in accordance with various kinds of electrode plate materials 1 as an example, but the pressurizing force range B may be automatically set. In other words, a memory for storing predetermined pressurizing force ranges B corresponding to various kinds of electrode plate materials 1 in which the kind of base material 1a or active material 1b or the filling density of the active material 1b differs with each other and a controller with a micro computer and the like for controlling the whole device may be provided. When the cutting processes are started, the kind of electrode plate material 1 to be cut is inputted into the controller so that the controller reads the pressurizing force range B corresponding to the assigned kind of electrode plate material 1 out of the memory and controls the cylinders 34 and 33 on the basis of the pressurizing force range B to automatically adjust the pressurizing force on the top and bottom strippers 12 and 14.

In the electrode plate manufacturing device according to the second embodiment of the present invention, as in the case of the foregoing first embodiment, even if a cut burr 31 or a curling burr 32 is generated (refer to FIG. 8) due to wear on the blades 11a and 13a of the cut dies 11 and 13, such burrs 31 and 32 protrude from the compressed portion 2a in the central portion in the thickness direction and the thickness d of the compressed portion 2a is set within a range of $\frac{1}{10}$ to $\frac{1}{2}$ of the original thickness D so that the burrs 31 and 32 do not protrude from the surface of the electrode plate 2. Thus, the burrs 31 and 32 do not cause the occurrence of a short circuit between the electrodes when being installed in a battery and hence no problem comes up. In other words, the cut dies 11 and 13 are available until wear on each of the blades 11a and 13a progresses to a certain extent, so that it is possible to say that an enough life is ensured.

As in the case of the device according to the first embodiment, the electrode plate manufacturing device according to the second embodiment also manufactures an electrode plate 2A shown in FIG. 9A which is trimmed by the top and bottom cut dies 11 and 13 and an electrode plate 2B shown in FIG. 9B into which a hoop-shaped electrode plate material 1 is cut. In the electrode plate 2A, a thin compressed portion 202 is formed in the central portion of the whole periphery of side faces in the thickness direction. In the electrode plate 2B, a thin compressed portion 202 is formed in the central portion of ahead and behind side faces in a transferring direction in the thickness direction.

INDUSTRIAL APPLICABILITY

According to a method for manufacturing the electrode plate for the battery of the present invention, as described above, the cut portion of the electrode plate material is cut by the top and bottom cut die while being compressed with the pressurizing force within the predetermined range irrespective of difference in the kind of electrode plate material to form a thin compressed portion in the central portion in the thickness direction. Therefore, the electrode plate material can be cut with restraining the occurrence of the collapse of the active material due to excess of the compression of the active material and miniaturizing a cut burr without reducing productivity and increasing costs. Accordingly, it is possible to improve the yield of the electrode plate and also manufacture the electrode plate for the battery which does not cause a short circuit between the electrode plates when being installed in the battery.

The invention claimed is:

1. A method for manufacturing an electrode plate for a battery, the method comprising steps of:
   intermittently transferring a strip-shaped electrode plate material in a longitudinal direction of the strip-shaped electrode plate material at intervals of a predetermined length and stopping the transferred strip-shaped electrode plate material in a fixed position;
   compressing a cut portion of the electrode plate material from above and below by a top stripper and a top cut die which slide on each other and a bottom stripper and a bottom cut die which slide on each other, thereby reducing a thickness of the cut portion; and
   cutting the compressed and thickness-reduced cut portion by sliding a top blade disposed on the top cut die and a bottom blade disposed on the bottom cut die on each other.

2. The method for manufacturing an electrode plate for a battery according to claim 1, wherein the cut portion of the electrode plate material is compressed by the top stripper and the bottom cut die opposed to each other and between the top cut die and the bottom stripper opposed to each other, respectively.

3. The method for manufacturing an electrode plate for a battery according to claim 2, wherein:
the top stripper has a first top protrusion protruding from a bottom surface of the top stripper and the bottom stripper has a first bottom protrusion protruding a top surface of the bottom stripper, and
the first top and first bottom protrusions locally compress the cut portion of the electrode plate material.

4. The method for manufacturing an electrode plate for a battery according to claim 3, further comprising, before the step of compressing, a step of arranging a bottom surface of the top stripper to be held below a bottom end of the top cut die with a predetermined distance,
wherein the electrode plate material starts being cut when the bottom end of the top cut die descends to a position of being flush with the bottom surface of the top stripper.

5. The method for manufacturing an electrode plate for a battery according to claim 1, wherein after the electrode plate material is cut by the step of cutting into the electrode plate, a cut end of the electrode plate has a structure such that a part of the compressed and thickness-reduced cut portion protrudes laterally from a cutting plane of the electrode plate.

6. A method for manufacturing an electrode plate for a battery, the method comprising steps of:
intermittently transferring a strip-shaped electrode plate material in a longitudinal direction of the strip-shaped electrode plate material at intervals of a predetermined length and stopping the strip-shaped electrode plate material in a fixed position;
compressing a cut portion of the electrode plate material from above and below by a top stripper and a top cut die which slide on each other and a bottom stripper and a bottom cut die which slide on each other, thereby reducing a thickness of the cut portion; and
cutting the compressed and thickness-reduced cut portion by sliding a top blade disposed on the top cut die and a bottom blade disposed on the bottom cut die on each other, wherein a pressurizing force for compression is applied on the top stripper and the bottom stripper which compress the electrode plate material with the opposed bottom cut die and the top cut die, respectively, and the pressurizing force is automatically adjusted so as to fall within a predetermined range set in advance.

7. The method for manufacturing an electrode plate for a battery according to claim 6, wherein the pressurizing force is applied on the top stripper and the bottom stripper with the use of pressurizing cylinders by which the pressurizing forces are automatically adjusted so as to fall within the predetermined range set in advance in response to a reaction force from the electrode plate material under compression.

8. The method for manufacturing an electrode plate for a battery according to claim 1, wherein in the step of compressing, the thickness of the cur portion is reduced to from $1/10$ to $1/2$ of an original thickness of the strip-shaped electrode plate material.

9. The method for manufacturing an electrode plate for a battery according to claim 3, wherein:
the top cut die has a second top protrusion protruding from a bottom surface of the top cur die and the bottom cut die has a second bottom protrusion protruding a top surface of the bottom cut die, and
the first top protrusion and the second bottom protrusion face and locally compress the cut portion of the electrode plate material and the first bottom protrusion and the second top protrusion face and locally compress the cut portion of the electrode plate material.

10. The method for manufacturing an electrode plate for a battery according to claim 6, wherein in the step of compressing, the thickness of the cur portion is reduced to from $1/10$ to $1/2$ of an original thickness of the strip-shaped electrode plate material.

* * * * *